(12) United States Patent
Bunel et al.

(10) Patent No.: US 12,288,393 B2
(45) Date of Patent: Apr. 29, 2025

(54) CLASSIFYING OUT-OF-DISTRIBUTION DATA USING A CONTRASTIVE LOSS

(71) Applicant: Google LLC, Mountain View, CA (US)

(72) Inventors: Rudy Bunel, London (GB); Jim Huibrecht Winkens, London (GB); Abhijit Guha Roy, London (GB); Olaf Ronneberger, London (GB); Seyed Mohammadali Eslami, London (GB); Ali Taylan Cemgil, London (GB); Simon Kohl, London (GB)

(73) Assignee: Google LLC, Mountain View, CA (US)

( * ) Notice: Subject to any disclaimer, the term of this patent is extended or adjusted under 35 U.S.C. 154(b) by 358 days.

(21) Appl. No.: 17/798,969

(22) PCT Filed: Jun. 4, 2021

(86) PCT No.: PCT/US2021/035842
§ 371 (c)(1),
(2) Date: Aug. 11, 2022

(87) PCT Pub. No.: WO2021/247962
PCT Pub. Date: Dec. 9, 2021

(65) Prior Publication Data
US 2023/0107505 A1 Apr. 6, 2023

Related U.S. Application Data

(60) Provisional application No. 63/035,578, filed on Jun. 5, 2020.

(51) Int. Cl.
*G06V 10/82* (2022.01)
*G06T 7/00* (2017.01)

(52) U.S. Cl.
CPC ............ *G06V 10/82* (2022.01); *G06T 7/0012* (2013.01); *G06T 2207/20081* (2013.01); *G06V 2201/03* (2022.01)

(58) Field of Classification Search
CPC .. G06V 10/82; G06V 2201/03; G06T 7/0012; G06T 2207/20081; G06N 3/045; G06N 20/20; G06N 3/084
See application file for complete search history.

(56) References Cited

U.S. PATENT DOCUMENTS

| 2021/0125006 A1* | 4/2021 | Seo .......................... G06N 3/08 |
| 2021/0141995 A1* | 5/2021 | Lundgaard ............. G06V 10/40 |

(Continued)

FOREIGN PATENT DOCUMENTS

| CN | 110651280 | * | 1/2020 |
| CN | 110969191 | * | 4/2020 |

OTHER PUBLICATIONS

Machine translation for CN 110969191 (Year: 2020).*

(Continued)

*Primary Examiner* — Qian Yang
(74) *Attorney, Agent, or Firm* — Fish & Richardson P.C.

(57) ABSTRACT

Methods, systems, and apparatus, including computer programs encoded on a computer storage medium, for training a neural network to (i) generate accurate network outputs for a machine learning task and (ii) generate intermediate outputs that can be used to reliably classify out-of-distribution inputs. In one aspect, a method comprises: training the neural network using supervised and contrastive losses, comprising repeatedly performing operations including: obtaining first and second network inputs; processing each network input using the neural network to generate its respective network input embedding; processing the first network input using the neural network to generate a network output; and adjusting the network parameter values using supervised and contrastive loss gradients, wherein: the supervised loss is based on: (i) the network output, and (ii) a corresponding target network output; and the contrastive (Continued)

loss is based on at least: (i) the first network input embedding, and (ii) the second network input embedding.

18 Claims, 5 Drawing Sheets

(56) References Cited

U.S. PATENT DOCUMENTS

| | | | | |
|---|---|---|---|---|
| 2021/0287084 | A1* | 9/2021 | Sivakumar | G06N 3/04 |
| 2021/0353203 | A1* | 11/2021 | Burman | G16H 50/30 |
| 2021/0365771 | A1* | 11/2021 | Speakman | G06N 3/08 |

OTHER PUBLICATIONS

Machine translation for 110651280 (Year: 2020).*
Bachman et al., "Learning representations by maximizing mutual information across views," Advances in Neural Information Processing Systems, Dec. 2019, 11 pages.
Blundell et al., "Weight uncertainty in neural networks," arXiv, May 21, 2015, 10 pages.
Chen et al., "A simple framework for contrastive learning of visual representations," arXiv, Feb. 13, 2020, 17 pages.
Chen et al., "A variational dirichlet framework for out-of-distribution detection," arXiv, Apr. 20, 2019, 8 pages.
Choi et al., "WAIC, but Why? Generative Ensembles for Robust Anomaly Detection," arXiv, May 23, 2019, 11 pages.
De Vries et al., "Learning Confidence for Out-of-Distribution Detection in Neural Networks," arXiv, Feb. 13, 2018, 12 pages.
Gal et al., "Dropout as a Bayesian Approximation: Representing Model Uncertainty in Deep Learning," Proceedings of The 33rd International Conference on Machine Learning, 2016, 10 pages.
He et al., "Deep residual learning for image recognition," Proceedings of the IEEE conference on Computer Vision and Pattern Recognition, Jun. 2016, pp. 770-778.
He et al., "Momentum contrast for unsupervised visual representation learning," arXiv, Mar. 23, 2020, 12 pages.
Henaff et al., "Data-efficient image recognition with contrastive predictive coding," Proceedings of the 37th International Conference on Machine Learning, 2020, 11 pages.
Hendrycks et al., "A baseline for detecting misclassified and out-of-distribution examples in neural networks," arXiv, Oct. 3, 2018, 12 pages.
Hendrycks et al., "Deep anomaly detection with outlier exposure," arXiv, Oct. 3, 2018, 12 pages.
Hendrycks et al., "Using self-supervised learning can improve model robustness and uncertainty," Advances in Neural Information Processing Systems, Dec. 2019, 12 pages.
International Preliminary Report on Patentability in International Appln. No. PCT/US2021/035842, mailed on Dec. 15, 2022, 8 pages.
International Search Report and Written Opinion in International Appln. No. PCT/US2021/035842, mailed on Sep. 21, 2021, 14 pages.
Kamoi et al., "Why is the mahalanobis distance effective for anomaly detection?" arXiv, Apr. 30, 2020, 23 pages.
Krizhevsky, "Learning multiple layers of features from tiny images," Technical report, Apr. 8, 2009, 60 pages.
Lakshminarayanan et al., "Simple and scalable predictive uncertainty estimation using deep ensembles," Advances in neural information processing systems, Dec. 2017, 12 pages.
Lee et al., "A simple unified framework for detecting out-ofdistribution samples and adversarial attacks," Advances in Neural Information Processing Systems, Dec. 2018, 11 pages.
Lee et al., "Training confidence-calibrated classifiers for detecting out-of-distribution samples," arXiv, Feb. 23, 2018, 16 pages.
Liang et al., "Enhancing the reliability of out-of-distribution image detection in neural networks," arXiv, Aug. 30, 2020, 15 pages.
Malinin et al., "Predictive uncertainty estimation via prior networks," Advances in Neural Information Processing Systems, Dec. 2018, 12 pages.
Masana et al., "Metric learning for novelty and anomaly detection," arXiv, Aug. 16, 2018, 17 pages.
Mohseni et al., "Self-supervised learning for generalizable out-of-distribution detection," Proceedings of the AAAI Conference on Artificial Intelligence, Apr. 3, 2020, 8 pages.
Muller et al., "When does label smoothing help?" Advances in Neural Information Processing Systems, Dec. 2019, 10 pages.
Nalisnick et al., Do deep generative models know what they don't know?, arXiv, Feb. 24, 2019, 19 pages.
Nalisnick et al., "Hybrid models with deep and invertible features," arXiv, May 29, 2019, 11 pages.
Netzer et al., "Reading digits in natural images with unsupervised feature learning," Advances in Neural Information Processing Systems, Dec. 2011, 9 pages.
Nguyen et al., "Deep neural networks are easily fooled: High confidence predictions for unrecognizable images," Proceedings of the IEEE conference on Computer Vision and Pattern Recognition, Jun. 2015, pp. 427-436.
Recht et al., "Do ImageNet Classifiers Generalize to ImageNet?" Proceedings of the 36th International Conference on Machine Learning, Jun. 2019, 12 pages.
Ren et al., "Likelihood ratios for out-of-distribution detection," Advances in Neural Information Processing Systems, Dec. 2019, 12 pages.
Sastry et al., "Detecting out-of-distribution examples with gram matrices," Proceedings of the 37th International Conference on Machine Learning, 2020, 11 pages.
Scheirer et al., "Toward open set recognition," IEEE Transactions on Pattern Analysis and Machine Intelligence, Nov. 29, 2012, 35(7):1757-1772.
Shalev et al., "Out-of-distribution detection using multiple semantic label representations," Advances in Neural Information Processing Systems, Dec. 2018, 11 pages.
Vyas et al., "Out-of-distribution detection using an ensemble of self supervised leave-out classifiers," Proceedings of the European Conference on Computer Vision, 2018, pp. 550-564.
Zhang et al., "COVID-19 Screening on Chest X-ray images using deep learning based anomaly detection," arXiv, Mar. 27, 2020, 6 pages.
Zhang et al., "Hybrid models for open set recognition," arXiv, Aug. 4, 2020, 16 pages.
Zisselman et al., "Deep residual flow for novelty detection," Proceedings of the IEEE/CVF Conference on Computer Vision and Pattern Recognition (CVPR), Jun. 2020, pp. 13994-14003.
Office Action in European Appln. No. 21735555.1, mailed on Feb. 20, 2025, 5 pages.

* cited by examiner

US 12,288,393 B2

CLASSIFYING OUT-OF-DISTRIBUTION DATA USING A CONTRASTIVE LOSS

CROSS-REFERENCE TO RELATED APPLICATION

This application is a National Stage Application under 35 U.S.C. § 371 and claims the benefit of International Application No. PCT/US2021/035842, filed Jun. 4, 2021, which claims priority to U.S. Application No. 63/035,578, filed Jun. 5, 2020, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations for training a neural network to: (i) generate accurate network outputs for a machine learning task and (ii) generate intermediate outputs that can be used to reliably classify out-of-distribution network inputs.

As used throughout this document, a network input to a neural network can be referred to as being "out-of-distribution" if the network input is drawn from a different distribution than that of a set of network inputs that were used to train the neural network. An out-of-distribution network input can, in general, be significantly different from the set of network inputs that were used to train the neural network. For example, an out-of-distribution network input can significantly differ in "style" (e.g., visual appearance), "content" (e.g., semantic content), or both, from the set of network inputs that were used to train the neural network.

For example, a given network input can be referred to as being "out-of-distribution", e.g., if the neural network performs a classification task by classifying network inputs into a predetermined set of possible classes, and the given network input is not included in any of the possible classes. In a particular example, if the neural network performs a classification task by classifying medical images into possible classes of disease, then a medical image corresponding to a disease that is not included in any of the possible disease classes can be out-of-distribution. A given network input can also be referred to as being out-of-distribution, e.g., if a similarity between: (i) the given network input, and (ii) a set of training network inputs used to train the neural network, does not a satisfy a threshold. For example, if the neural network performs a classification task by classifying medical images into possible disease classes, then a medical image corresponding to one of the possible disease classes but having visual characteristics that substantially differ from the training network inputs can be out-of-distribution.

A given network input can be referred to as being "in-distribution" if it is not out-of-distribution.

As used throughout this document, an "embedding" can refer to an ordered collection of numerical values, e.g., a vector or matrix of numerical values.

As used throughout this document, an "intermediate output" of a neural network can refer to data generated by one or more hidden layers of the neural network by processing a network input. An intermediate output of a neural network can be represented as an ordered collection of numerical values, e.g., a vector or matrix of numerical values.

According to a first aspect, there is provided a method performed by one or more data processing apparatus for training a neural network having a plurality of network parameters to (i) generate accurate network outputs for a machine learning task and (ii) generate intermediate outputs that can be used to reliably classify out-of-distribution network inputs, the method comprising training the neural network using a supervised loss and a contrastive loss, comprising repeatedly performing operations including: obtaining a first network input and a second network input; processing the first network input using the neural network to generate: (i) an embedding of the first network input as an intermediate output of the neural network, and (ii) a network output corresponding to the first network input; processing the second network input using the neural network to generate at least an embedding of the second network input as an intermediate output of the neural network; and adjusting current values of the network parameters using gradients of the supervised loss and the contrastive loss, wherein: the supervised loss is based on an error between: (i) the network output corresponding to the first network output, and (ii) a target network output corresponding to the first network input; and the contrastive loss is based on at least: (i) the embedding of the first network input, and (ii) the embedding of the second network input.

In some implementations, adjusting current values of the network parameters using gradients of the contrastive loss comprises: determining the contrastive loss based at least in part on a similarity between the embedding of the first network input and the embedding of the second network input.

In some implementations, the first network input and the second network input both correspond to a same training network input, and adjusting current values of the network parameters using gradients of the contrastive loss comprises: adjusting the current values of the network parameters using the gradients to encourage the neural network to generate respective embeddings of the first network input and the second network input that are more similar.

In some implementations, obtaining the first network input and the second network input comprises: sampling a first transformation from a set of possible transformations and applying the first transformation to the same training network input to generate the first network input; and sampling a second transformation from the set of possible transformations and applying the second transformation to the same training network input to generate the second network input.

In some implementations, the first network input and the second network input do not correspond to a same training network input, and adjusting current values of the network parameters using gradients of the contrastive loss comprises: adjusting the current values of the network parameters using the gradients to encourage the neural network to generate respective embeddings of the first network input and the second network input that are less similar.

In some implementations, determining the contrastive loss based at least in part on a similarity between the embedding of the first network input and the embedding of the second network input comprises: processing the embedding of the first network input using a projection function to generate a projected embedding of the first network input; processing the embedding of the second network input using the projection function to generate a projected embedding of the second network input; and determining the similarity between the embedding of the first network input and the embedding of the second network input based on a similarity measure between: (i) the projected embedding of the first network input, and (ii) the projected embedding of the second network input.

In some implementations, the similarity measure is a cosine similarity measure.

In some implementations, the projection function comprises a projection neural network having a plurality of projection neural network parameters.

In some implementations, the method further comprises adjusting current values of the projection neural network parameters using the gradients of the contrastive loss.

In some implementations, the projected embedding of the first network input has a lower dimensionality than the first network input, and the projected embedding of the second network input has a lower dimensionality than the second network input.

In some implementations, the method further comprises, after training of the neural network: obtaining a test network input; processing the test network input using the neural network to generate: (i) an embedding of the test network input as an intermediate output of the trained neural network, and (ii) a network output corresponding to the test network input; and determining, based at least in part on the embedding of the test network input, that the test network input is an out-of-distribution input.

In some implementations, determining, based at least in part on the embedding of the test network input, that the test network input is an out-of-distribution input comprises: determining a likelihood of the embedding of the test network input under a probability distribution over a space of possible embeddings; and determining that the test network input is an out-of-distribution input based on the likelihood of the embedding of the test network input under the probability distribution over the space of possible embeddings.

In some implementations, the probability distribution over the space of possible embeddings is determined based on a collection of embeddings in the space of possible embeddings, wherein each embedding is generated by processing an in-distribution network input using the trained neural network to generate an embedding of the in-distribution network input as an intermediate output of the trained neural network.

According to another aspect, there is provided a method comprising using a neural network to perform a machine learning task, the neural network having been trained using a method according to any one of the preceding claims.

In some implementations, the machine learning task comprises a classification task, and the neural network is configured to process a network input to generate a network output corresponding to the network input that comprises a respective score for each of a plurality of classes.

In some implementations, the neural network is configured to process a network input that comprises an image or an audio signal.

In some implementations, the image is a medical image of a patient.

In some implementations, each class corresponds to a respective medical condition and the respective score for each class represents a predicted likelihood that the patient has the corresponding medical condition.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the respective methods described herein.

According to another aspect, there are provided one or more non-transitory computer storage media storing instructions that when executed by one or more computers cause the one or more computers to perform operations of the respective methods described herein.

Particular embodiments of the subject matter described in this specification can be implemented so as to realize one or more of the following advantages.

The system described in this specification trains a neural network to: (i) generate accurate network outputs for a machine learning task, and (ii) generate intermediate outputs that can be used to reliably classify out-of-distribution network inputs. The system does not require access to network inputs that are labelled as being out-of-distribution, which can be difficult to collect in practice. Rather, the system can train the neural network to generate intermediate outputs that can be used to reliably classify out-of-distribution network inputs based on only training network inputs that are in-distribution. Therefore, the system can consume fewer computational resources (e.g., memory and computing power) than some conventional systems that require access to network inputs that are labeled as being out-of-distribution, e.g., by obviating the need to store out-of-distribution network inputs and train the neural network using out-of-distribution network inputs.

A neural network can have an increased likelihood of generating inaccurate network outputs for out-of-distribution network inputs. The system described in this specification enables out-of-distribution network inputs to be reliably classified, and thereafter, e.g., separately processed by a human expert, or withheld from downstream processing. Therefore, the system can enable neural networks to be deployed in a wider variety of applications, in particular safety critical applications, than neural networks trained by conventional systems. Examples of safety critical applications can include using a neural network to predict medical diagnoses, or using a neural network to control a robot or a (semi-) autonomous vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
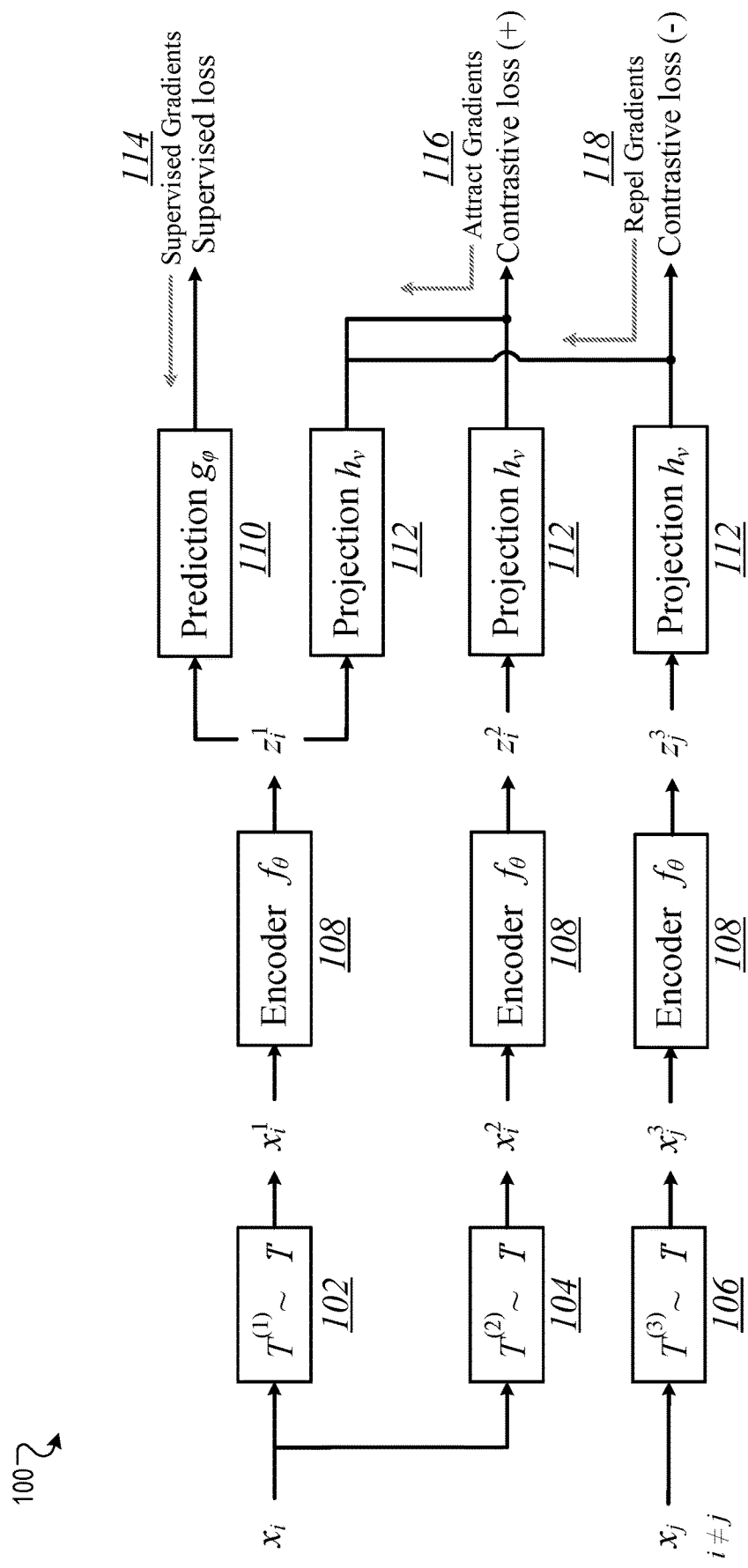
FIG. 1 is a diagram of an example data flow illustrating the operations performed by a training system.

FIG. 1 shows a diagram of an example data flow 100 illustrating the operations performed by a training system. An example of a training system, e.g., training system 200, that can performed the operations of data flow 100 is described in more detail below with reference to the description of FIG. 2.

The training system trains a neural network to process a network input to generate: (i) a network output that defines a prediction characterizing the network input, and (ii) an intermediate output (e.g., a "network input embedding") that can be used to determine if the network input is an "out-of-distribution" network input.

The neural network can be configured to process any appropriate type of network input, e.g., image data, audio data, text data, lidar data, hyper-spectral data, or a combination thereof (Throughout this specification, processing an image, e.g., using a neural network, refers to processing the intensity values, e.g., color intensity values, associated with the pixels of the image).

The neural network can be configured to generate any appropriate type of network output, e.g., a classification output, a regression output, or a combination of both.

A classification output can include a respective score for each class in a set of possible classes (e.g., a set of medical conditions), where the score for each class can define a likelihood that the network input is included in the class (e.g., that a medical image of a patient represented by the network input corresponds to a medical condition in the set of medical conditions).

A regression output can include one or more numerical values from continuous ranges of possible numerical values. For example, the network input can be a video showing a contraction of a heart, and the network output can define a prediction for the fraction of blood pumped out of the left ventricle of the heart during the contraction.

A neural network trained by the system described in this specification can be deployed in any of a variety of applications, e.g., to control a robotic agent or a (semi-) autonomous (land, sea, or air) vehicle, or to predict medical diagnoses.

In some implementations, the system can train a neural network to perform a medical data processing task, e.g., by processing a network input representing medical data, e.g., medical images, lab data (e.g., representing levels of various enzymes in a patient), or signal data (e.g., electrocardiogram (EKG) data), to generate a network output that defines a prediction characterizing the medical data, e.g., a medical diagnosis for a patient.

The neural network can be configured to process medical images of any appropriate modality, e.g., computed tomography (CT) images, magnetic resonance images (MRIs), ultrasound (US) images, pathology images, or a combination thereof.

The medical images can depict any of a variety of regions of tissue in a patient, e.g., the brain, the liver, the breasts, the prostate, the intestines, or the whole body.

The neural network can process a medical image characterizing tissue in a patient to generate any appropriate network output, e.g., a classification output that includes one or more of: (i) a respective referral score for each of a plurality of referral decisions that represents a predicted likelihood that the referral decision is the most appropriate referral decision for the patient given a current state of the tissue, (ii) a respective condition score for each of one or more medical conditions that represents a predicted likelihood that the patient has the medical condition given the current state of the tissue, (iii) a respective progression score for each of one or more condition states that represents a predicted likelihood that a state of a corresponding medical condition will progress to the condition state at a particular future time given the current state of the tissue, or (iv) a respective treatment score for each of a plurality of treatments that represents a predicted likelihood that the treatment is the best treatment for the patient given the current state of the tissue.

In some implementations, the neural network can process a mammogram (i.e., an x-ray picture of a breast) to generate network output that defines a likelihood that the breast is cancerous, and that the breast will become cancerous within a predefined duration of time (e.g., one (1) year).

In some implementations, the neural network can process a dermatological image, e.g., that shows a region of skin of a patient, to generate a network output that defines a likelihood that dermatological image shows a cancerous region of skin, or a region of skin that will become cancerous within a predefined duration of time (e.g., one (1) year).

In some implementations, the training system can train the neural network to process a set of network inputs that represent the pixels of an image to generate a classification output that includes a respective score for each object category in a set of possible object categories (e.g., vehicle, pedestrian, bicyclist, etc.). The score for an object category can define a likelihood that the image depicts an object that belongs to the object category.

In some implementations, the training system can train the neural network to process a set of network inputs that represent audio samples in an audio waveform to perform speech recognition, i.e., to generate an output that defines a sequence of phonemes, graphemes, characters, or words corresponding to the audio waveform.

In some implementations, the training system can train the neural network to process a set of network inputs that represent words in a sequence of words to perform a natural language processing task, e.g., topic classification or summarization. To perform topic classification, the training system trains the neural network to generate a network output that includes a respective score for each topic category in a set of possible category categories (e.g., sports, business, science, etc.). The score for a topic category can define a likelihood that the sequence of words pertains to the topic category. To perform summarization, the training system trains the neural network to generate a network output that includes an output sequence of words that has a shorter length than the input sequence of words and that captures important or relevant information from the input sequence of words.

In some implementations, the training system can train the neural network for a neural machine translation task, e.g., to process a set of network inputs that represent a sequence of text, e.g., a sequence of words, phrases, characters, or word pieces, in one language, to generate a network output that can be a translation of the sequence of text into another language, i.e., a sequence of text in the other language that is a translation of the input sequence of text.

In some implementations, the training system can train the neural network to perform an audio processing task. For example, if the network inputs represent a spoken utterance, then the output generated by the neural network can be a score for each of a set of pieces of text, each score representing an estimated likelihood that the piece of text is the correct transcript for the utterance. As another example, if the network inputs represent a spoken utterance, the output generated by the neural network can indicate whether a particular word or phrase ("hotword") was spoken in the utterance. As another example, if the network inputs represent a spoken utterance, the output generated by the neural network can identify the natural language in which the utterance was spoken.

In some implementations, the training system can train the neural network to perform a natural language processing or understanding task, e.g., an entailment task, a paraphrase task, a textual similarity task, a sentiment task, a sentence completion task, a grammaticality task, and so on, that operates on a set of network inputs representing text in some natural language.

In some implementations, the training system can train the neural network to perform a text to speech task, where the network inputs represent text in a natural language or features of text in a natural language and the network output is a spectrogram, a waveform, or other data defining audio of the text being spoken in the natural language.

In some implementations, the training system can train the neural network to perform a health prediction task, where the network inputs represent data derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

In some implementations, the training system can train the neural network to perform a text generation task, where the network inputs represent a sequence of text, and the output is another sequence of text, e.g., a completion of the input sequence of text, a response to a question posed in the input sequence, or a sequence of text that is about a topic specified by the first sequence of text. As another example, the network inputs can represent data other than text, e.g., an image, and the output sequence can be text that describes the data represented by the network inputs.

In some implementations, the training system can train the neural network to perform a protein modeling task, e.g., where the network inputs represent a protein and the network output characterizes the protein. For example, the network output can characterize a predicted stability of the protein or a predicted structure of the protein.

In some implementations, the training system can train the neural network to perform a point cloud processing task, e.g., where the network input represents a point cloud (e.g., generated by a lidar or radar sensor) and the network output characterizes, e.g., a type of object represented by the point cloud.

In some implementations, the training system can train the neural network to perform a combination of multiple individual machine learning tasks, e.g., two or more of the machine learning tasks mentioned above.

Generally, the training system can train a neural network by adjusting the current values of the neural network parameters at each training iteration in a series of training iterations. The example data flow shown in FIG. 1 illustrates a single training iteration performed by the training system. The training system can initialize the values of the neural network parameters before training begins, e.g., by randomly sampling each parameter value from a uniform distribution over a range of values.

The neural network can include: an encoder neural network 108 ($f_\theta$), a prediction neural network 110 ($g_\varphi$), and a projection neural network 112 ($h_v$). In some cases, the projection neural network 112 is included in the neural network only during training (i.e., to facilitate the training, as will be described in more detail below), and can be removed from the neural network after training is complete.

At each training iteration, the training system can obtain a first training network input and a second training network input. The training system can obtain the training network inputs, e.g., by randomly sampling each training network input from a set of training network inputs to obtain a representative sampling of the set of training network inputs over multiple training iterations. The first and second network training inputs can correspond to the same training network input, or two different training network inputs. With reference to the example data flow of FIG. 1, the system can obtain a first training network input $x_i$ and a second training network input $x_j$, where i and j index training network inputs. In the particular example of the data flow of FIG. 1, i never equals j, i.e., $x_i$ and $x_j$ correspond to different training network inputs.

At each training iteration, the training system can obtain transformations from a set of transformations. The training system can obtain the transformations, e.g., by randomly sampling from the set of transformations to obtain a representative sampling from the set of transformations over multiple training iterations. Generally, the obtained transformations are distinct, i.e., they are different from one another. Each transformation can represent an intervention on the "style" of a training network input while leaving the "content" (i.e., underlying semantic information) unchanged. With reference to the example data flow of FIG. 1, the system can obtain three transformations, in particular transformation 102, $T^{(1)}$, transformation 104, $T^{(2)}$, and transformation 106, $T^{(3)}$, from the set of transformations T.

At each training iteration, the training system can apply the transformations to the obtained training network inputs to generate a network input (a new "version" of the training network input) from each training network input. The training system can apply distinct transformations to the same training network input to generate distinct versions of the same training network input, or the training system can apply transformations to different training network inputs to generate versions of network inputs generated from different training network inputs. With reference to the example data flow of FIG. 1, the training system can apply the first transformation 102, $T^{(1)}$, to training network input $x_i$ to generate a respective first network input, $x_i^1$, the second transformation 104, $T^{(2)}$, to the same training network input $x_i$ to generate a respective second network input, $x_i^2$, and the third transformation 106, $T^{(3)}$, to a different training network input $x_j$ to generate a respective third network input, $x_j^3$.

The first network input, $x_i^1$, and the second network input, $x_i^2$, correspond to the same training network input, $x_i$, and the third network input, $x_j^3$, corresponds to a different training network input, $x_j$.

At each training iteration, the training system can generate an embedding of each network input as an intermediate output of the neural network. For example, the training system can generate an embedding of each network input using the encoder neural network 108. The training system can generate a respective first network input embedding $z_i^1$ of the first network input $x_i^1$, a respective second network input embedding $z_i^2$ of the second network input $x_i^2$, and a respective third network input embedding $z_j^3$ of the third network input $x_j^3$, each by processing the respective network input to generate the respective network input embedding using the encoder neural network 108.

At each training iteration, the training system can generate a network output corresponding to the first network input embedding. For example, the training system can generate a network output corresponding to the first network input embedding using a prediction neural network. With reference to the example data flow of FIG. 1, the training system can process the first network input embedding, $z_i^1$, using a prediction neural network 110, $g_\varphi$, to generate a network output. The network output can be, e.g., a classification output, or a regression output, which characterizes the network input.

At each training iteration, the training system can generate a projected embedding of each network input embedding. For example, the training system can generated a projected embedding of each network input embedding by processing the respective network input embedding using a projection neural network. With reference to the example data flow of FIG. 1, the training system generates a projected embedding of each network input embedding using a projection neural network 112, $h_\nu$.

At each training iteration, the training system can generate contrastive loss gradients and supervised loss gradients to adjust the current values of the neural network parameters. For example, the system can generate "attract" gradients of the contrastive loss function by processing projected embeddings generated from the same training network input (e.g., to minimize differences among network input embeddings generated from the same training network input, thereby "attracting" the embeddings), and "repel" gradients of the contrastive loss function by processing projected embeddings generated from different training network inputs (e.g., to maximize differences among network input embeddings generated from different training network inputs, thereby "repelling" the embeddings). With reference to the example data flow of FIG. 1, the system generates "repel" gradients 118 by processing projected embeddings generated from different training network inputs (in particular by processing the projected embeddings of network input embeddings, $z_i^2$ and $z_j^3$), "attract" gradients 116 by processing projected embedding generated from the same training network input (in particular by processing the projected embeddings of network input embeddings, and $z_i^2$), and supervised loss gradients 114 by processing a network output generated from the first network input embedding, $z_i^1$.

At each training iteration, the training system adjusts the current values of the network parameters by backpropagating the gradients. For example, the training system can adjust the current values of the prediction neural network parameters based on the supervised loss gradients, the current values of the projection neural network parameters based on the contrastive loss gradients, and the current values of the encoder neural network parameters based on both the supervised loss and contrastive loss gradients. With reference to the example data flow of FIG. 1, the training system can adjust the current parameter values of the prediction neural network 110, $g_\varphi$, based on the supervised loss gradients 114, of the projection neural network 112, $h_\nu$, based on the contrastive loss gradients 116 and 118, and of the encoder neural network 108, $f_\theta$, based on both the supervised loss gradients 114 and the contrastive loss gradients 116 and 118.

Optimizing the supervised loss and contrastive loss can encourage the neural network to generate accurate network outputs and to generate intermediate network outputs ("network input embeddings") which are more semantically meaningful. In particular, optimizing the supervised loss can encourage the neural network to generate accurate predictions for a machine learning task. Optimizing the contrastive loss can encourage the neural network to generate embeddings which are more similar (more "clustered", or "attracted") for network inputs generated from the same training network input, and more differentiated (more "distant", or "repelled") for network inputs generated from different training network inputs.

An embedding of a network input that is generated as an intermediate output of the neural network by processing the network input can be processed to classify the network input as being an out-of-distribution input or an in-distribution input, which is discussed in further detail below with reference to the description of FIG. 5. Classifying a network input as an out-of-distribution input can enable the network input to be flagged for further review (e.g., manual review by an expert, e.g., a physician), withheld from downstream processing, or both.

Figure 2:
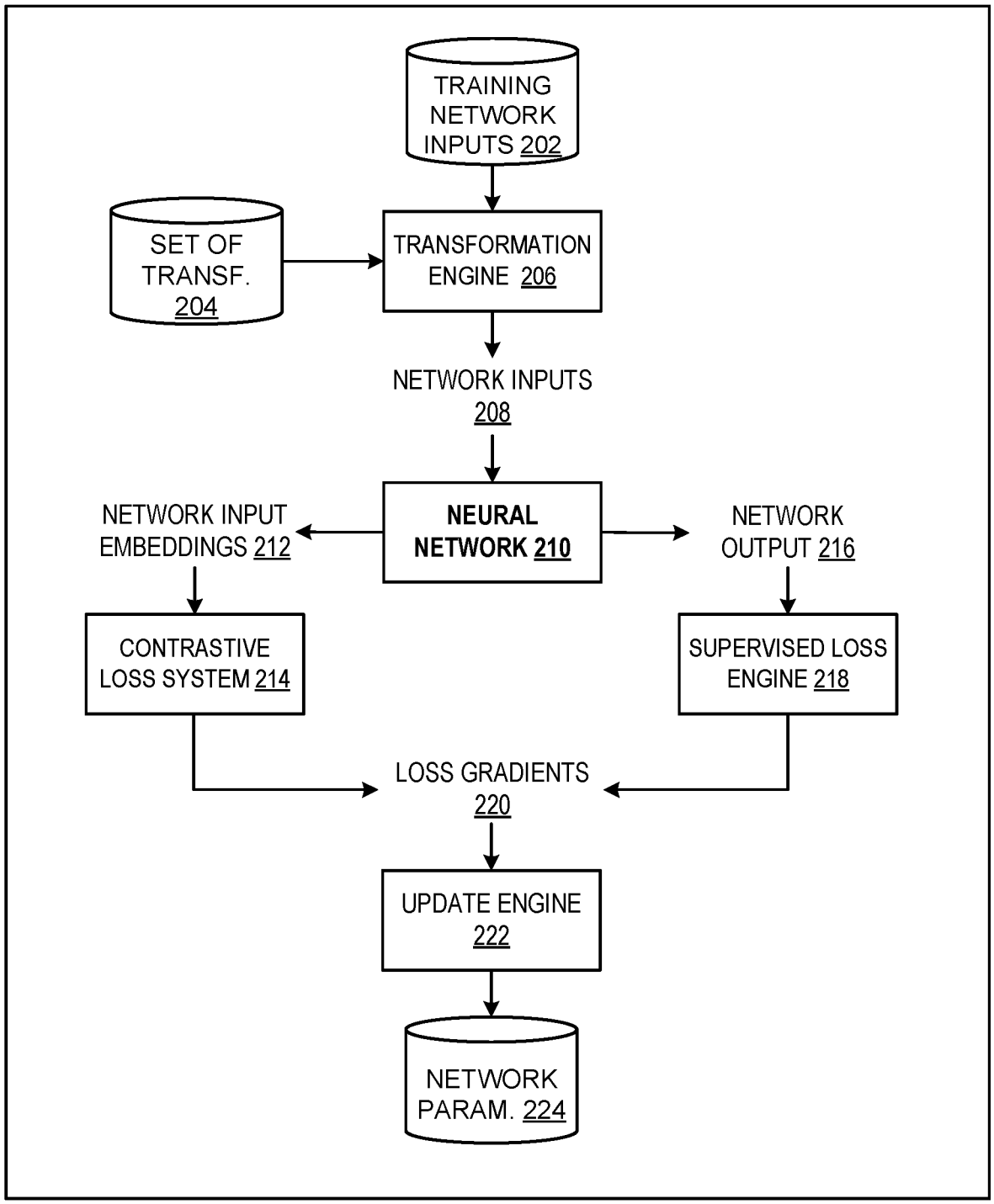
FIG. 2 is a block diagram of an example training system.

FIG. 2 shows an example training system 200. The training system 200 is an example of a system implemented as computer programs on one or more computers in one or more locations in which the systems, components, and techniques described below are implemented.

The training system 200 can train a neural network, e.g., neural network 210, to perform a machine learning task, in particular by iteratively adjusting the values of the neural network parameters 224 to optimize an objective function at each of a series of training iterations, as is discussed in further detail below.

The neural network 210 can have any appropriate neural network architecture that enables it to perform its described function, i.e., processing a network input to generate: (i) a network output defining a prediction characterizing the network input, and (ii) an embedding of the network input. In particular, the neural network 210 can include any appropriate types of neural network layers (e.g., fully-connected layers, attention-layers, convolutional layers, etc.) in any appropriate numbers (e.g., 5 layers, 10 layers, or 25 layers), and connected in any appropriate configuration (e.g., as a linear sequence of layers).

At each training iteration, the training system 200 can obtain multiple training network inputs, including a first training network input and a second training network input, from a set of training network inputs 202. The first training network input and the second network training input can be the same training network input, or they can be different training network inputs. The set of training network inputs 202 can include multiple training network inputs. The training system can obtain the training network inputs, e.g., by randomly sampling from the set of the training network inputs 202 at each training iteration to achieve a representative sampling of the set of training network inputs over multiple iterations.

At each training iteration, the training system 200 can obtain multiple transformations, including a first transformation and a second transformation, from a set of transformations 204. Generally, the transformations are distinct. The training system can obtain the transformations, e.g., by randomly sampling from the set of transformations 204 at each training iteration in order to generate a representative sampling of the set of transformations 204 over multiple training iterations. For example, the set of possible transformations for a network input representing, e.g., an image, can include, e.g., rotations (e.g., to a variety of possible rotation angles), color tinting (e.g., with a variety of different colors), gray scaling, expansion and cropping (using various expansion and cropping parameters), contraction and padding (using various contraction and padding parameters), pixel-wise noise (using levels strengths of noise), or any combination thereof.

At each training iteration, the training system 200 can obtain multiple network inputs, including a first network input and a second network input, e.g., network inputs 208, to train the neural network. For example, the transformation engine 206 can generate each respective network input by applying a respective transformation to a respective training network input. In one example, the transformation engine 206 can generate a respective first network input and a respective second network input, by applying a first transformation to a first training network input to generate the respective first network input, and by applying a second transformation to a second training network input to generate the respective second network input. The first network input and the second network input can correspond to the same training network input, where the transformation engine 206 applies distinct transformations to the same training network input, or the first network input and the second network input can correspond to two different training network inputs, where the transformation engine 206 applies the transformations to two different training network inputs.

At each iteration, training system 200 can generate the network input embeddings 212 by processing the network inputs 208 using a neural network 210. For example, the neural network 210 can generate each network input embedding as an intermediate output of one or more hidden layers of the neural network by processing a respective network input. In one example, the neural network 210 can process a first network input to generate a respective first network input embedding, and can process a second network input to generate a respective second network input embedding.

At each iteration, the training system 200 can generate a network output 216 by processing a first network input using a neural network 210. For example, the neural network 210 can process the first network input of the network inputs 208 to generate the network output 216, as is discussed in further detail below with reference to the description of FIG. 3.

At each iteration, the training system 200 can generate supervised loss gradients by processing a network output 216 using a supervised loss engine 218. For example, the supervised loss engine 218 can generate the supervised loss gradients of a supervised loss which, e.g., measures an error between (1) the network output generated by the neural network by processing a network input, and (2) a target output that should be generated by the neural network by processing the network input. The supervised loss gradients can be joined in linear combination with contrastive loss gradients generated by the contrastive loss system 214 to form the loss gradients 220, as is discussed in further detail below with reference to the description of FIG. 3.

At each iteration, the training system 200 can process the network input embeddings 212 to generate the contrastive loss gradients of a contrastive loss using a contrastive loss system 214. The contrastive loss can encourage network input embeddings generated from transformed versions of the same training network input to be more similar, and network input embeddings generated from different training network inputs (i.e., that are not transformed versions of the same training network input) to be more different. The contrastive loss gradients can be joined in linear combination with the supervised loss gradients to form the loss gradients 220. An example process for generating the contrastive loss gradients is described in more detail below with reference to FIG. 4.

At each training iteration, the training system 200 can adjust the network parameters 224 by processing the loss gradients 220 using an update engine 222. For example, the update engine 224 can backpropagate the loss gradients 220 through the neural networks to adjust the current values of the neural network parameters 224, as is discussed in further detail below with reference to the description of FIG. 3.

After training, the neural network 210 can be deployed to generate predictions in a wide variety of applications, e.g., generating medical diagnoses. In addition to generating predictions, the neural network 210 can generate a network input embedding of each network input that can be used to determine if the network input is an out-of-distribution input. In response to determining that a network input is an out-of-distribution input, the prediction generated for the network input can be flagged for further review or withheld from downstream processing, as is discussed in further detail with reference to the description of FIG. 5.

Figure 3:
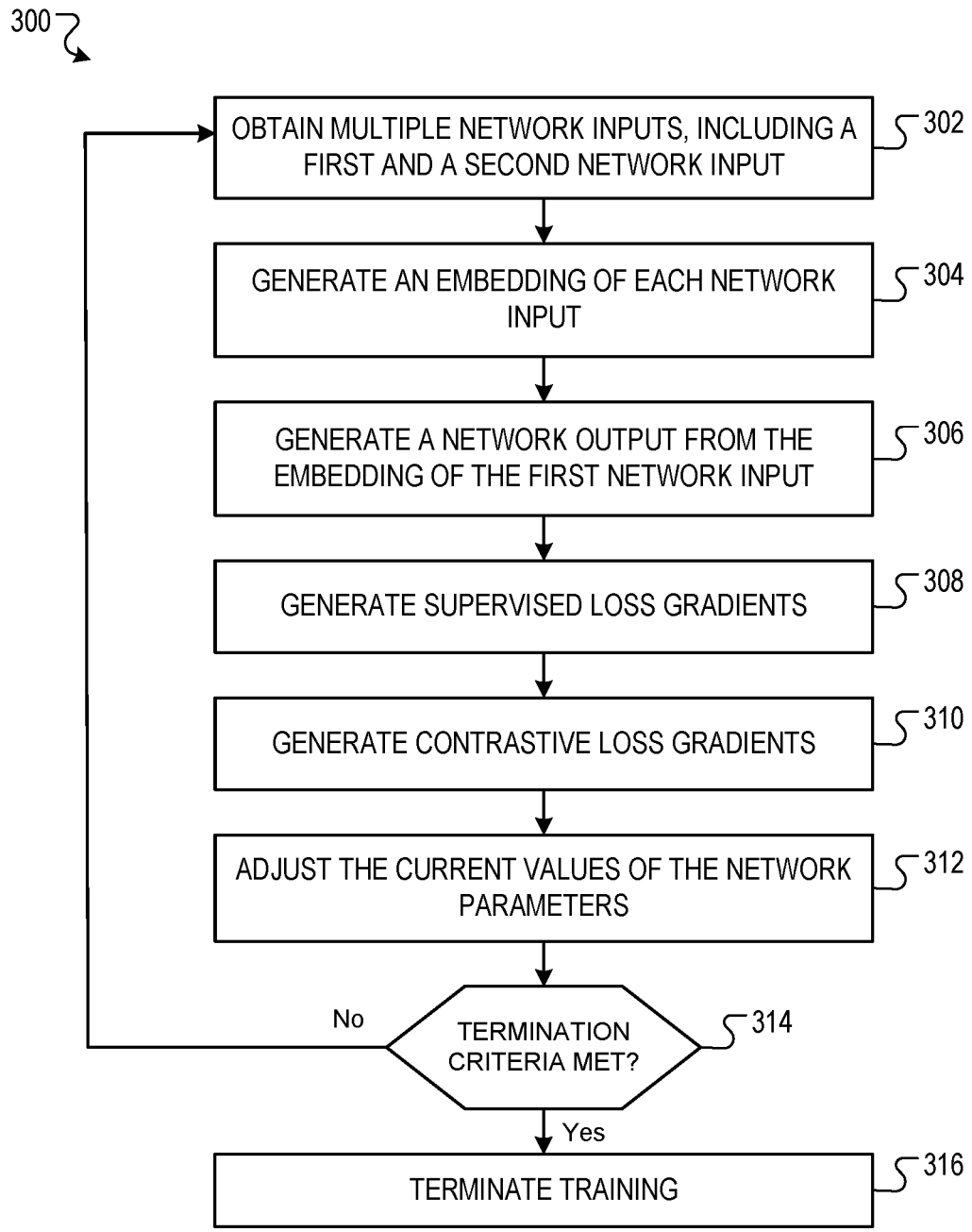
FIG. 3 is a flow diagram of an example process for training a neural network to generate network outputs for a machine learning task and intermediate outputs used to classify out-of-distribution network inputs.

FIG. 3 is a flow diagram of an example process for training a neural network to generate prediction outputs for a machine learning task and intermediate outputs for classifying a network input as an out-of-distribution input. For convenience, the process 300 will be described as being performed by a system of one or more computers located in one or more locations. For example, a training system, e.g., the training system 200 of FIG. 2, appropriately programmed in accordance with this specification, can perform the process 300.

The neural network can include an encoder neural network, a prediction neural network, and a projection neural network. The encoder neural network can process a network input to generate an embedding of the network input as an intermediate output of the neural network, and the prediction neural network can process the embedding of a network input to generate a network output characterizing the network input. The projection neural network can be used in training to facilitate training the encoder neural network to generate more semantically meaningful network input embeddings, as is discussed in further detail below with reference to the description of FIG. 4.

The steps of the process 300 are performed at each training iteration in a sequence of training iterations. For convenience, the steps of the process 300 are described with reference to a current training iteration.

The training system obtains multiple network inputs, including a first network input and a second network input (302). Network inputs can correspond to the same training network input, or to different training network inputs. For example, if two network inputs correspond to the same training network input, the training system can randomly sample one training network input from the set of training network inputs, and can randomly sample two different transformations from a set of transformations. The training system can then apply the first transformation to the same training network input to generate a respective first network input, and apply the second transformation to the same training network input to generate a respective second network input, represented as $$x_i^k = T^{(k)}(x_i),\qquad(1)$$

where $x_i^k$ represents the result of applying transformation k to training network input i, i indexes the network inputs, k indexes the transformations, and $T^{(k)}$ represents a transformation k.

Generating distinct network inputs from the same training network input by applying distinct transformations to the same training network input can enable the training system to train the neural network to generate network input embeddings corresponding to the same training network input that are more similar (i.e., more tightly clustered in embedding space, or to "attract" the network input embeddings), as will be described in more detail below.

In another example, if two network inputs correspond to different training network inputs, the training system can randomly sample two different training network inputs from a set of training network inputs, and can randomly sample two transformations from the set of transformations. The training system can then apply the first transformation to the first training network input to generate a respective first network input, and can apply the second transformation to the second training network input to generate a respective second network input.

The set of possible transformations for a network input representing, e.g., an image, can include, e.g., rotations (e.g., to a variety of possible rotation angles), color tinting (e.g., with a variety of different colors), gray scaling, expansion and cropping (using various expansion and cropping parameters), contraction and padding (using various contraction and padding parameters), pixel-wise noise (using levels strengths of noise), or any combination thereof.

The training system generates an embedding of each network input using an encoder neural network (304). For example, the system can generate a respective network input embedding by processing a network input using the encoder neural network. Processing a network input using the encoder neural network to generate a network input embedding can be represented as:

$$z_i^k = f_\theta(x_i^k),\qquad(2)$$

where $z_i^k$ represents the network input embedding of transformation k of network input i, i indexes the network inputs, k indexes the transformations, and $f_\theta$ represents the encoder neural network.

The encoder neural network can have any appropriate neural network architecture that enables it to perform its described function, i.e., processing a network input to generate an embedding of the network input. In particular, the encoder neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

The training system can generate a network output from the embedding of the first network input (306). For example, the training system can generate a network output by processing the first network input embedding using a prediction neural network. The network output can define a prediction characterizing the network input, e.g., a classification or regression prediction.

The prediction neural network can have any appropriate neural network architecture that enables it to perform its described function, i.e., processing a network input embedding to generate a respective network output. In particular, each prediction neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

The training system can generate supervised loss gradients (308) based on the network output. For example, the training system can generate supervised loss gradients of a supervised loss function based on an error between a network output corresponding to the first network input and a target network output corresponding to the first network input. The supervised loss function can be, e.g., a softmax cross-entropy loss, a squared-error loss, or any other appropriate loss, and can also include, e.g., label-smoothing.

The training system can generate contrastive loss gradients (310) by processing the network input embeddings. Training the neural network using a contrastive loss function can enable the neural network to generate more distinct embeddings of network inputs corresponding to different training network inputs, and to generate more similar embeddings of network inputs corresponding to the same training network input. Generating more semantically meaningful embeddings of network inputs can be useful for detecting out-of-distribution inputs, which can enable the neural network to be deployed more widely in safety critical tasks, e.g., in predicting diagnoses based on medical data. An example process for generating gradients of a contrastive loss is described in more detail with reference to FIG. 4.

The training system can adjust the current values of the network parameters (312) by processing the supervised loss gradients and the contrastive loss gradients. In some implementations, the training system can conduct the training in two stages. In the first stage, the training system can adjust the current values of the network parameters (e.g., of the projection neural network and of the encoder neural network) based on only the gradients of a contrastive loss (while refraining from generating gradients of the supervised loss). In the second stage, the training system can also include a supervised loss. In the second stage, the training system can join the supervised loss gradients and contrastive loss gradients in a linear combination. In either stage, the training system can adjust the current values of the network parameters by backpropagating the specified gradients.

The training system can determine whether the termination criteria have been met (314). If the training system determines that the termination criteria have not been met, the training system loops back to step (302). For example, the training system can determine if a predefined number of training iterations have been performed.

If the training system determines that the termination criteria have been met, the training system terminates the training (316).

Figure 4:
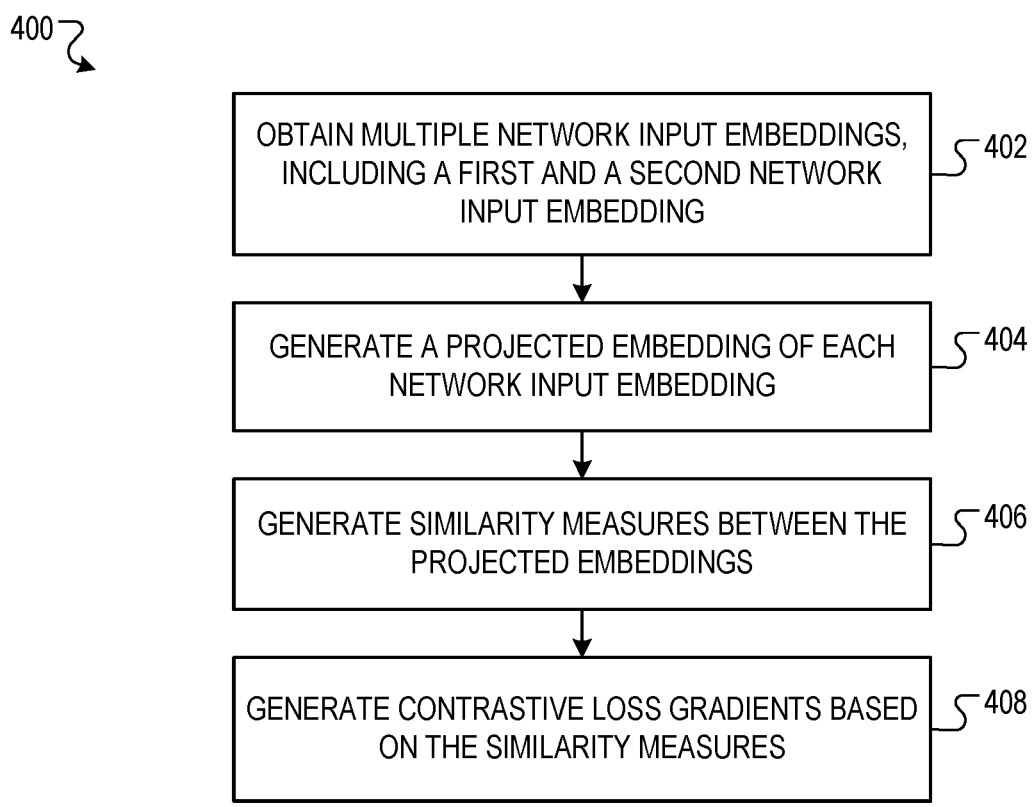
FIG. 4 is a flow diagram of an example process for generating contrastive loss gradients.

FIG. 4 is a flow diagram of an example process for generating contrastive loss gradients. For convenience, the process 400 will be described as being performed by a system of one or more computers located in one or more locations. For example, a contrastive loss system, e.g., the contrastive loss system 220 of FIG. 2, appropriately programmed in accordance with this specification, can perform the process 400.

The system obtains multiple network input embeddings, including a first network embedding and a second network embedding (402). The network input embeddings can correspond to the same training network input, or to different network inputs, as is discussed in further detail above with reference to FIG. 2 and FIG. 3.

The system generates a projected embedding of each network input embedding (404) using a projection neural network. The projection neural network can be a part of the overall neural network which is being trained, e.g., the neural network referenced in the description of FIG. 3. The respective projected embedding of a network input embedding can have a lower dimensionality than the network input embedding. For example, the projected embedding of the first network embedding can have a lower dimensionality than the first network input embedding, and the projected embedding of the second network input embedding can have a lower dimensionality than the second network embedding. The projection neural network can generate a respective projected embedding of a network input embedding by processing the respective network input embedding, represented as:

$$\pi_i^k = h_v(z_i^k), \quad (3)$$

where $m_i^k$ represents the projected embedding of the network input embedding $z_i^k$, i indexes the network inputs, k indexes the transformations, and $h_v$ represents the projection neural network.

The encoder neural network can have any appropriate neural network architecture that enables it to perform its described function, i.e., processing a network input embedding to generate a respective projected embedding. In particular, the projection neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

The system can generate similarity measures between the projected embeddings (406) using a similarity operation. For example, the similarity measure can be a cosine similarity measure, represented as, $$\sigma_{ij}^{lk} = (\pi_i^l)^T \pi_j^k / (\|\pi_i^l\| \|\pi_j^k\|), \quad (4),$$

where $\sigma_{ij}^{lk}$ represents the cosine similarity measure between a projected embedding $\pi_i^l$ and a projected embedding $\pi_j^k$, i and j index the network inputs, k and l index the transformations, $(\cdot)^T$ represents the transpose operation of a projected embedding, and $\|\cdot\|$ represents the magnitude operation of a projected embedding.

The system can generate contrastive loss gradients based on the similarity measures (408). The system can generate gradients of a contrastive loss function based on the similarity measures. For example, the contrastive loss function can attempt to maximize the cosine similarity of projected embedding pairs originating from the same network input, i.e., encourage their cosine similarity measure to go to one, while minimizing the cosine the similarity of pairs originating from two different network inputs, i.e., encourage their cosine similarity measure to go to zero. The contrastive loss function for a network input i can be represented as, $$L_{con,i} = -\sum_{a \in \{0,1\}} \log \left( \frac{\exp(\sigma_{ii}^{a,1-a}/\tau)}{\sum_{j \in \{1,\ldots,N\}} [\exp(\sigma_{ij}^{a,1-a}/\tau)] + \sum_{j \in \{1,\ldots,N\} \setminus i} [\exp(\sigma_{ij}^{aa}/\tau)]} \right), \quad (5)$$

where $\sigma_{ij}^{a,1-a}$ represents the similarity measure between a projected embedding generated from a first version a of a training network input i and a projected embedding generated from a second version 1−a of a training network j, i and j index network inputs, a indexes a respective first transformation and 1−a indexes a respective second transformation, and $\tau$ represents a temperature parameter. The contrastive loss of a training network input i in equation (5) includes a numerator term which represents the similarity measure between a respective first version and a respective second version generated from the same training network input i. The contrastive loss of a training network input i also includes a denominator term which represents (1) a sum of similarity measures between the respective first version of the training network input i, and a respective second version of each network input (including the training network input i), and (2) a sum of similarity measures between the respective first version of the training network in input i, and a respective first version of each network input (excluding the network input i).

Training the neural network using a contrastive loss function can enable the neural network to generate more distinct embeddings of network inputs corresponding to different training network inputs (e.g., based on the denominator term in equation (5)), and to generate more similar embeddings of network inputs corresponding to the same training network input (e.g., using the numerator term in equation (5)). Generating more semantically meaningful embeddings of network inputs can be useful for detecting out-of-distribution inputs, which can enable the neural network to be deployed more widely in safety critical tasks, e.g., in predicting diagnoses based on medical data.

Figure 5:
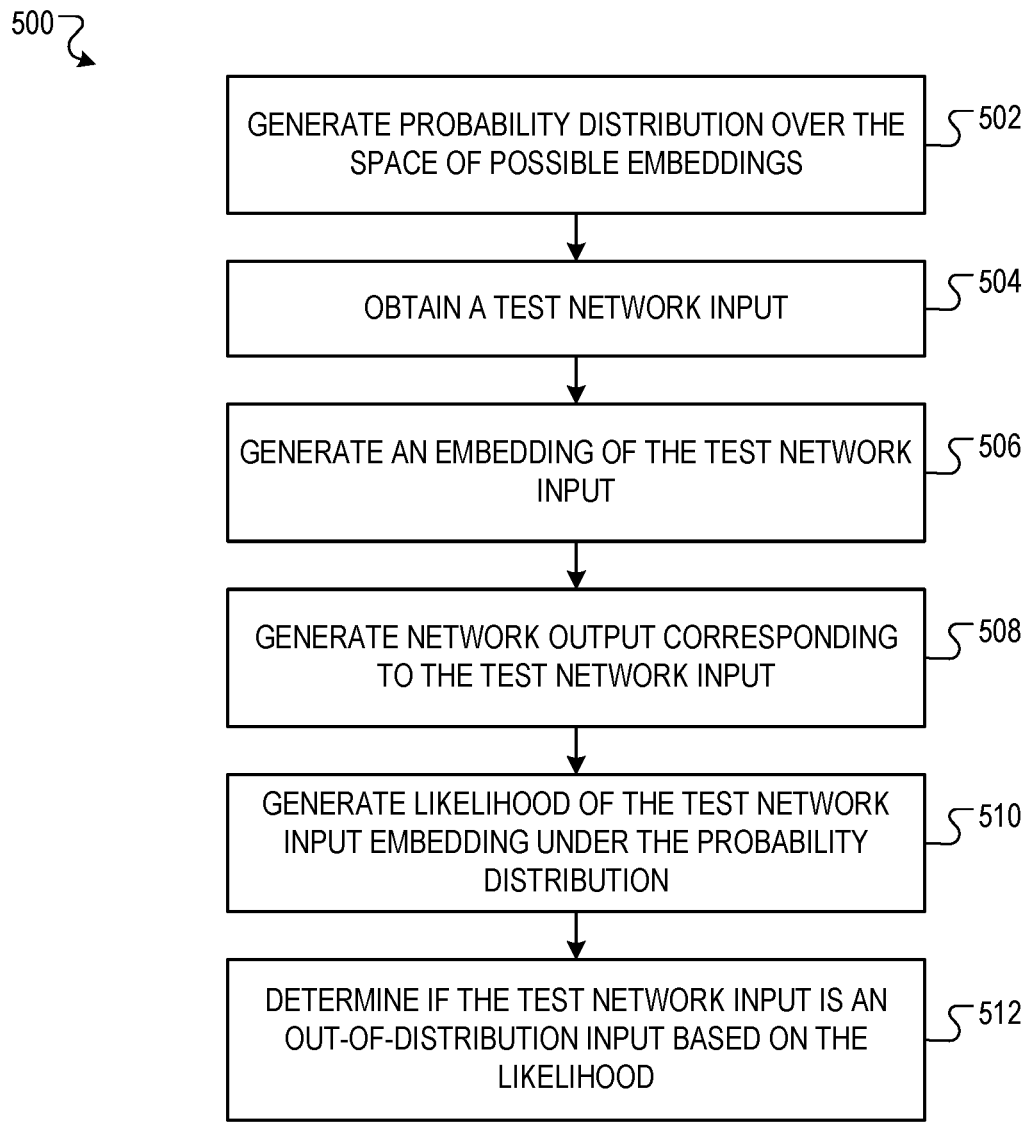
FIG. 5 is a flow diagram of an example process for generating a network output and determining if the respective network input is an out-of-distribution input.

FIG. 5 is a flow diagram of an example process for generating a network output for a test network input and determining if the test network input is an out-of-distribution input. For convenience, the process 500 will be described as being performed by a system of one or more computers located in one or more locations. For example, an out-of-distribution detection system including a neural network, e.g., the neural network 210 of FIG. 2, trained by an appropriate training system, e.g., the training system 200 of FIG. 2, appropriately programmed in accordance with this specification, can perform the process 500.

The system generates a probability distribution over a space of possible network input embeddings (502). To generate the probability distribution, the system can process each of multiple (in-distribution) network inputs using the neural network to generate a respective network input embedding of each network input, i.e., as an intermediate output of the neural network, as described in more detail above. The system can then generate the probability distribution by fitting the parameters of the probability distribution to the set of network input embeddings (e.g., using a method of moments technique, or any other appropriate technique). In one example, each network input is associated with a respective class c in a set of predetermined classes, and the system can generate the probability distribution by, for each class c, fitting an n-dimensional multivariate Gaussian distribution $\mathcal{N}(\mu_c, \Sigma_c)$ to the set of network input embeddings corresponding to class c (with n equal to the dimension of each network input embedding). In this example, the set of probability distributions corresponding to the respective classes collectively define the probability distribution over the space of possible network input embeddings.

The system obtains a test network input (504). The test network input can be provided to the system, e.g., by a user of the system.

The system generates an network input embedding of the test network input (506). For example, the system can process the test network input using the neural network to generate the network input embedding of the test network input as an intermediate output of the neural network, as described in more detail above.

The system generates a network output corresponding to the test network input (508). The network output can define a prediction characterizing the network input, e.g., a classification or regression prediction, and can be generated by an output layer of the neural network, as described in more detail above.

The system generates a likelihood of the network input embedding of the test network input under the probability distribution over the space of possible network input embeddings (510). For example, if each network input belongs to a respective class c, then the system can generate a respective likelihood $\lambda_c(x)$ of the test network input embedding with respective to each class c, e.g., as:

$$\lambda_c(x) = -(f_\theta(x) - \mu_c)^T \Sigma_c^{-1}(f_\theta(x) - \mu_c) - \log((2\pi)^n \det(\Sigma_c)), \quad (6)$$

where $f_\theta$ represents the test network input embedding, $\mu_c$ and $\Sigma_c$ correspond to the multivariate Gaussian probability distribution for the class c (as described with reference to step 502), det represents the determinate of a matrix, $(\cdot)^{-1}$ represents the inverse of a matrix, and $(\cdot)^T$ represents the transpose of a vector.

The system determines if the test network input is an out-of-distribution input based on the likelihood of the test network input under the probability distribution over the space of possible network input embeddings (512). For example, the system can determine if the test network input is an out-of-distribution input by generating a score based on the likelihoods) $\lambda_c(x)$ of the test network input x with respect to each class c, e.g., as:

$$s(x) = \max_c(\lambda_c(x)), \quad (7)$$

where s(x) represents the out-of-distribution score for the test network input x, and max is the maximization function over the likelihood of the test network input with respect to each class c. A high score s(x) indicates that the embedding of the test network input lies close to the typical set of network input embeddings for at least one of the classes c. A low score s(x) indicates that the embedding of the test network input lies far from all training set examples, i.e., that the test network input is likely an out-of-distribution input. The system can determine that the test network input is an in-distribution network input if the likelihood of the test network input embedding under the probability distribution over the space of possible network input embeddings, e.g., as characterized by s(x) in equation (7), exceeds a predefined threshold (e.g., 0.5, or any other appropriate threshold). Otherwise, the system can determine that the test network input is an out-of-distribution network input.

Determining that the test network input is an out-of-distribution input can enable the test network input to be flagged for further review, withheld from subsequent downstream processing, or both.

In some implementations, the system first determines whether a test network input is an out-of-distribution input before generating a network output corresponding to the test network input. In these implementations, in response to determining that the test network input is an out-of-distribution input, the system can refrain from generating a network output for the test network input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method performed by one or more computers, the method comprising:
    training a neural network to jointly optimize a supervised loss and a contrastive loss, comprising:
        obtaining a first network input and a second network input;
        processing the first network input using a neural network to generate: (i) an embedding of the first network input as an intermediate output of the neural network, and (ii) a prediction output for the first network input;
        processing the second network input using the neural network to generate at least an embedding of the second network input as an intermediate output of the neural network; and
        adjusting current values of the network parameters using gradients of the supervised loss and the contrastive loss, wherein:
            the supervised loss is based on an error between: (i) the prediction output for the first network output, and (ii) a target output for the first network input; and
            the contrastive loss is based on at least: (i) the embedding of the first network input, and (ii) the embedding of the second network input; and
    wherein after training, the neural network is used to perform out-of-distribution detection by performing operations comprising:
        obtaining a test network input;
        processing the test network input using the neural network to generate: (i) an embedding of the test network input as an intermediate output of the trained neural network, and (ii) a prediction output for the test network input;
        classifying the test network input as being an out-of-distribution network input based on a likelihood of the embedding of the test network input under a probability distribution over a space of possible embeddings; and
        in response, blocking the prediction output for the test network input from downstream processing.

2. The method of claim 1, wherein adjusting current values of the network parameters using gradients of the contrastive loss comprises:
    determining the contrastive loss based at least in part on a similarity between the embedding of the first network input and the embedding of the second network input.

3. The method of claim 2, wherein the first network input and the second network input both correspond to a same training network input, and adjusting current values of the network parameters using gradients of the contrastive loss comprises:
    adjusting the current values of the network parameters using the gradients to encourage the neural network to generate respective embeddings of the first network input and the second network input that are more similar.

4. The method of claim 3, wherein obtaining the first network input and the second network input comprises:
    sampling a first transformation from a set of possible transformations and applying the first transformation to the same training network input to generate the first network input; and
    sampling a second transformation from the set of possible transformations and applying the second transformation to the same training network input to generate the second network input.

5. The method of claim 2, wherein the first network input and the second network input do not correspond to a same training network input, and adjusting current values of the network parameters using gradients of the contrastive loss comprises:
    adjusting the current values of the network parameters using the gradients to encourage the neural network to generate respective embeddings of the first network input and the second network input that are less similar.

6. The method of claim 2, wherein determining the contrastive loss based at least in part on a similarity between the embedding of the first network input and the embedding of the second network input comprises:
    processing the embedding of the first network input using a projection function to generate a projected embedding of the first network input;
    processing the embedding of the second network input using the projection function to generate a projected embedding of the second network input; and
    determining the similarity between the embedding of the first network input and the embedding of the second network input based on a similarity measure between: (i) the projected embedding of the first network input, and (ii) the projected embedding of the second network input.

7. The method of claim 6, wherein the similarity measure is a cosine similarity measure.

8. The method of claim 6, wherein the projection function comprises a projection neural network having a plurality of projection neural network parameters.

9. The method of claim 8, further comprising adjusting current values of the projection neural network parameters using the gradients of the contrastive loss.

10. The method of claim 6, wherein the projected embedding of the first network input has a lower dimensionality than the first network input, and the projected embedding of the second network input has a lower dimensionality than the second network input.

11. The method of claim 1, wherein the probability distribution over the space of possible embeddings is determined based on a collection of embeddings in the space of possible embeddings, wherein each embedding is generated by processing an in-distribution network input using the trained neural network to generate an embedding of the in-distribution network input as an intermediate output of the trained neural network.

12. The method of claim 1, wherein the machine learning task comprises a classification task, and the neural network is configured to process a network input to generate a network output corresponding to the network input that comprises a respective score for each of a plurality of classes.

13. The method of claim 12, wherein the neural network is configured to process a network input that comprises an image or an audio signal.

14. The method of claim 13, wherein the image is a medical image of a patient.

15. The method of claim 14, wherein each class corresponds to a respective medical condition and the respective score for each class represents a predicted likelihood that the patient has the corresponding medical condition.

16. A system comprising:
    one or more computers; and one or more storage devices communicatively coupled to the one or more computers, wherein the one or more storage devices store instructions that, when executed by the one or more computers, cause the one or more computers to perform operations comprising:
training a neural network to jointly optimize a supervised loss and a contrastive loss, comprising:
obtaining a first network input and a second network input;
processing the first network input using a neural network to generate: (i) an embedding of the first network input as an intermediate output of the neural network, and (ii) a prediction output for the first network input;
processing the second network input using the neural network to generate at least an embedding of the second network input as an intermediate output of the neural network; and
adjusting current values of the network parameters using gradients of the supervised loss and the contrastive loss, wherein:
the supervised loss is based on an error between: (i) the prediction output for to the first network output, and (ii) a target output for the first network input; and
the contrastive loss is based on at least: (i) the embedding of the first network input, and (ii) the embedding of the second network input; and
wherein after training, the neural network is used to perform out-of-distribution detection by performing operations comprising:
obtaining a test network input;
processing the test network input using the neural network to generate: (i) an embedding of the test network input as an intermediate output of the trained neural network, and (ii) a prediction output for the test network input;
classifying the test network input as being an out-of-distribution network input based on a likelihood of the embedding of the test network input under a probability distribution over a space of possible embeddings; and
in response, blocking the prediction output for the test network input from downstream processing.

17. One or more non-transitory computer storage media storing instructions that when executed by one or more computers cause the one or more computers to perform operations comprising:
training a neural network to jointly optimize a supervised loss and a contrastive loss, comprising:
obtaining a first network input and a second network input;
processing the first network input using a neural network to generate: (i) an embedding of the first network input as an intermediate output of the neural network, and (ii) a prediction output for the first network input;
processing the second network input using the neural network to generate at least an embedding of the second network input as an intermediate output of the neural network; and
adjusting current values of the network parameters using gradients of the supervised loss and the contrastive loss, wherein:
the supervised loss is based on an error between: (i) the prediction output for the first network output, and (ii) a target output for the first network input; and
the contrastive loss is based on at least: (i) the embedding of the first network input, and (ii) the embedding of the second network input; and
wherein after training, the neural network is used to perform out-of-distribution detection by performing operations comprising:
obtaining a test network input;
processing the test network input using the neural network to generate: (i) an embedding of the test network input as an intermediate output of the trained neural network, and ii) a prediction output for the test network input;
classifying the test network input as being an out-of-distribution network input based on a likelihood of the embedding of the test network input under a probability distribution over a space of possible embeddings; and
in response, blocking the prediction output for the test network input from downstream processing.

18. The non-transitory computer storage media of claim 17, wherein adjusting current values of the network parameters using gradients of the contrastive loss comprises:
determining the contrastive loss based at least in part on a similarity between the embedding of the first network input and the embedding of the second network input.

* * * * *